United States Patent [19]
Logiadis et al.

[11] Patent Number: 5,669,189
[45] Date of Patent: Sep. 23, 1997

[54] ANTISEISMIC CONNECTOR OF LIMITED VIBRATION FOR SEISMIC ISOLATION OF AN STRUCTURE

[76] Inventors: Ioannis Logiadis; Emmanuel Logiadis, both of 40, Paritsi, N. Psychiko, Athens; George Logiadis, 8 Pliadon Street, GR-175 61 P., Faliron, all of Greece

[21] Appl. No.: 290,922

[22] PCT Filed: Dec. 23, 1993

[86] PCT No.: PCT/GR93/00022

§ 371 Date: Aug. 23, 1994

§ 102(e) Date: Aug. 23, 1994

[87] PCT Pub. No.: WO94/15047

PCT Pub. Date: Jul. 7, 1994

[30] Foreign Application Priority Data

Dec. 24, 1992 [GR] Greece ............... 920100576

[51] Int. Cl.[6] ................................. E02D 31/08
[52] U.S. Cl. ............. 52/167.4; 52/167.6; 52/167.8
[58] Field of Search .................. 52/167.4, 167.5, 52/167.6, 167.7, 167.8; 403/57, 74

[56] References Cited

U.S. PATENT DOCUMENTS

| | | |
|---|---|---|
| 2,690,074 | 9/1954 | Jones. |
| 3,794,277 | 2/1974 | Smedley et al.. |
| 3,795,949 | 3/1974 | Shorter. |
| 3,937,607 | 2/1976 | Rodormer. |
| 3,952,468 | 4/1976 | Soum. |
| 4,328,648 | 5/1982 | Kalpins .................... 52/167.4 |
| 4,593,502 | 6/1986 | Buckle. |
| 4,599,834 | 7/1986 | Fujimoto et al. ............. 52/167.8 |
| 4,917,211 | 4/1990 | Yamada et al.. |
| 5,014,474 | 5/1991 | Fyfe et al.. |
| 5,386,671 | 2/1995 | Hu et al.. |

FOREIGN PATENT DOCUMENTS

| | | | |
|---|---|---|---|
| 0 056 258 | 7/1982 | European Pat. Off.. | |
| 0 076 573 | 4/1983 | European Pat. Off.. | |
| 0 439 272 A3 | 7/1991 | European Pat. Off.. | |
| 2 515 718 | 5/1983 | France. | |
| E04B 1/98 | 10/1985 | Germany. | |
| 3408591 | 10/1985 | Germany | 52/167.6 |
| 59-134230 | 8/1984 | Japan. | |
| 361049028 | 3/1986 | Japan | 52/167.8 |
| 401198939 | 8/1989 | Japan | 52/167.8 |
| 1-278639 | 11/1989 | Japan. | |
| 402101241 | 4/1990 | Japan | 52/167.8 |
| 402101242 | 4/1990 | Japan | 52/167.8 |
| 3-4049 | 1/1991 | Japan. | |
| 403063362 | 3/1991 | Japan | 52/167.8 |
| 403076973 | 4/1991 | Japan | 52/167.7 |
| 403257237 | 11/1991 | Japan | 52/167.7 |
| 404089979 | 3/1992 | Japan | 52/167.7 |

*Primary Examiner*—Carl D. Friedman
*Assistant Examiner*—Yvonne Horton-Richardson
*Attorney, Agent, or Firm*—Fish & Richardson P.C.

[57] ABSTRACT

The present invention is related to an antiseismic connector of limited vibration for safe isolation of structures from earthquakes and other ground excitations, and for safe vertical interconnection of the superstructure to the foundation. The antiseismic connector is situated at the horizontal gap that separates the superstructure from the foundation at the pillars or walls of the superstructure. It connects the superstructure to the foundation through prestressed tendons from special material which not only permit the relative movement of the foundation to the superstructure but also create horizontal recentering forces and receive tensile forces that may be encountered at the isolation system due to overturning moments of the superstructure, thus creating a safe seismic isolation of the structure. The antiseismic connector is further composed of two plates, made of steel or of any other material with similar strength, the cross sectional area and form of which are demanded by the construction conditions in which it is placed. A bearing, which is suitable for isolation of structures from earthquakes and other ground excitations, is placed between the superstructure and the foundation. Corresponding pairs of casings such as cylinders or cones are located in the superstructure and in the foundation, and corresponding prestressed cables extend through the casings and are anchored in the foundation and in the superstructure, thereby interconnecting these two parts of the structure.

20 Claims, 6 Drawing Sheets

ANTISEISMIC CONNECTOR OF LIMITED VIBRATION FOR SEISMIC ISOLATION OF AN STRUCTURE

The present invention relates to an antiseismic connector of limited vibration for the safe seismic isolation of structures.

The description of the antiseismic connector of limited vibration, will be done as an indicating example for the case that the isolated structure is a building, and not to create limitations.

A building generally comprises a superstructure, which is above ground, and a foundation, which is embedded in the ground. A horizontal gap (joint) extends between the superstructure and the foundation and separates these two parts of the structure. The antiseismic connector of the present invention is disposed in the horizontal gap at the bottom of every column or wall of the superstructure, thereby creating vibration isolation of the superstructure. The connector connects the superstructure to the foundation so that both compressive and tensile vertical loads of the superstructure are translated to the foundation and reduces the seismic force input into the superstructure.

The connector connects the superstructure to the foundation using prestressed tendons or cables or rods (the terms 'tendon', 'cable', and 'rod' are used to describe either an individual wire, strand or bar or a group of wires, strands, or bars). In a preferred arrangement the prestressed tendons or cables will be vertically arranged or nearly so. The prestressed armament cables permit the relative movement of the foundation to the superstructure. The space needed for the unrestricted movement of the cables is provided by locating the cables in casings. The space between the cables and the casings will be preferably free (unbonded tensioned cables), but it can also be filled with a soft material which permits the relative movement between the endpoints of the cables. The prestressed cables create horizontal recentering forces which act to return the superstructure and foundation to their pre-earthquake spatial relationship.

After an in depth investigation and study of the problem, we came to the conclusion that whichever means of isolating a structure, from earthquakes or other ground excitations are used, the isolation system should be able to:

1) Securely deliver the vertical and horizontal loads of the superstructure, both static and dynamic, to the foundation.
2) Maintain the superstructure's vertical connection with the foundation with safety, regardless of the height of the superstructure, and receive both compressive and tensile vertical loads (±P).
3) Reduce the seismic force input to the superstructure.
4) Secure the superstructure from uplift due to overturning moments and from sidewise sliding as well as recenter it to its initial position.
5) Provide recentering capability to the superstructure.
6) Permit the easy inspection, repair and replacement of the connector, to its functioning condition after a certain time has elapsed.
7) Be easy to use and secure to the position at the base of the pillar where it is installed.
8) Be constructed simply, securely and economically.
9) Be easily placed during the initial construction of the building, under every plate at the base of the pillars of the superstructure.
10) Be easily adapted for use with the present construction system (concrete frame) in order to have an easy application.

These are the efficient and sought-after conditions that safe means of supporting the superstructure to its foundation should fulfill in seismically isolated constructions. No previously known ways of isolating the superstructure from its foundation, for example by the use of rubber bearings, fulfill all these efficient and sought-after conditions.

We designed and studied a special mechanism for seismic isolation of structures taking into consideration all the necessary conditions that have to be satisfied. The antiseismic connector of limited vibration for seismic isolation of a structure of this invention superbly fulfills all the 10 conditions.

It has the following capabilities:

a) It receives both compressive and tensile vertical loads (±P) from the superstructure and transfers them to the foundation.
b) It does not transfer all the horizontal vibrations of the foundation, to the superstructure.
c) It secures the superstructure from uplift due to overturning moments and from sidewise sliding arising from the ground excitation because of the prestressed cables.
d) It exerts restoring forces on the foundation and superstructure helping them to return to their pre-earthquake spatial relationship.

The antiseismic connector can be made of the following parts:

a) two iron plates of proper size and shape for the particular structure.
b) a bearing between the two plates which can be made of rubber material, or spherical bearings with an elastic or other base, or roller bearings with an elastic or other base, or sliding interfaces, or of any other material.
c) at least one pair of casings, such as cones or cylinders, mounted to the upper and lower plate at corresponding holes in the plates; and
d) prestressed armament tendons or cables which are held in place at corresponding pairs of casings such as cones or cylinders and holes.

The connector is situated at the base of the pillar between the superstructure and the foundation. Of course, the connector could be disposed along the bottom of the wall of the superstructure or other appropriate locations and still practice the invention.

Heretofore, buildings were constructed solidly fixed to the ground that was going to be shaken. Because of this, all the seismic vibrations of the ground were transferred to the superstructure, resulting in the creation of great forces of inertia on the superstructure, the deformation of the superstructure's components, the cracking of the walls and, ultimately, the destruction of the buildings. Earthquakes usually impose forces that cannot be borne by the reinforced concrete, therefore the concrete crumbles to the base of the pillars.

For greater protection of structures against earthquakes, or other ground excitations, the structure must be separated from the foundation with a horizontal antiseismic gap and the use of special bearings, so that the vibrations of the foundation which is solidly fixed to the ground are not transferred to the superstructure. For this reason, we studied and designed a structure system which creates a special way of supporting the superstructure on its foundation reducing the seismic force input into the superstructure. At the same time, the connector continues to vertically interconnect the superstructure to the foundation such that the vertical loads of the superstructure (compressive and tensile forces) are transferred to the foundation. The vertical interconnection is created by prestressed cables which are specially anchored to the superstructure and the foundation.

All these characteristics together with the advantages of the present invention will be revealed by the analytical description which follows. The invention will be better understood in view of the accompanying drawings which illustrate a preferred embodiment of it.

BRIEF DESCRIPTION OF THE DRAWINGS

Referring to the corresponding drawings, we will describe preferred embodiments of the invention.

DETAILED DESCRIPTION

Figure 1:
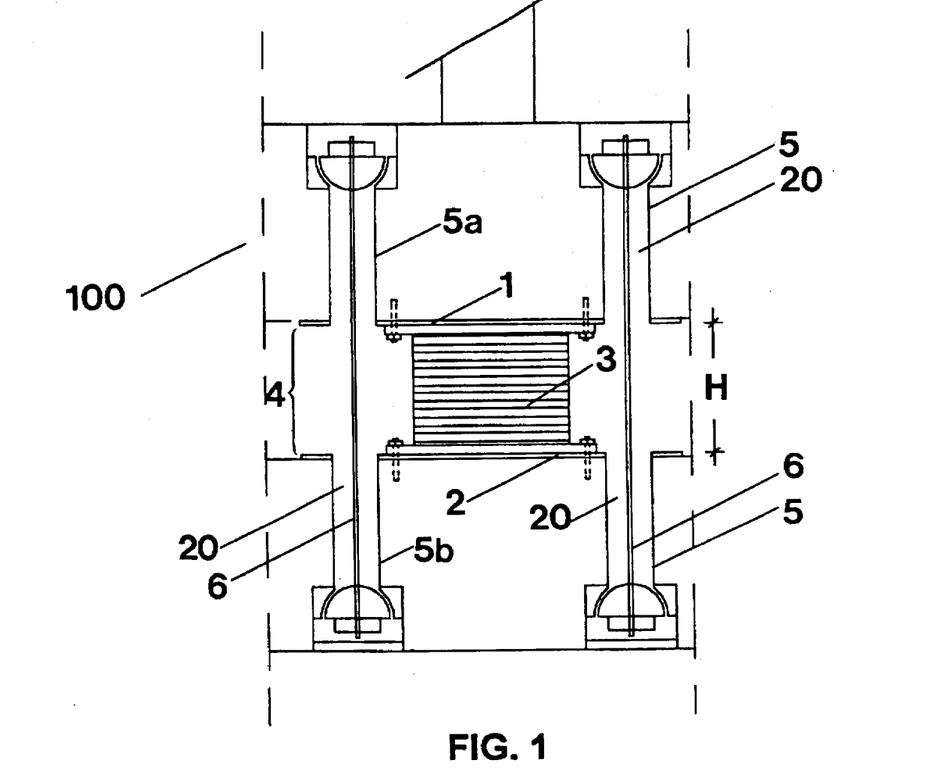
FIG. 1 is a schematic view of the antiseismic connector of this invention.

As seen in FIG. 1, an antiseismic connector 100 comprises two iron plates 1, 2 which have dimensions chosen by one skilled in the art to satisfy the demands of the structure in which the antiseismic connector will be installed. The distance H between the two iron plates is equal to the height H of the bearing 3 disposed between them. The prestressed cables 6 connect the superstructure to the foundation. In a preferred embodiment the prestressed tendons or cables will be vertically arranged or nearly so. The prestressed armament cables permit the relative movement of the foundation to the superstructure. The space needed for the unrestricted movement of the cables is provided by locating the cables in casings 5. The space 20 between the cables 6 and the casings 5 will be preferably free (unbonded tensioned cables), but it can also be filled with a soft material which permits the relative movement between the endpoints of the cables. The number and size of the armament cables are designed to receive all vertical tensile forces they may encounter at the isolation system due to overturning moments of the superstructure. The prestressed cables can be made of steel or its composites or synthetic material or its composites or any other material, as will be appreciated by one of ordinary skill in this art, and can be placed at any other part of the horizontal antiseismic joint (gap) 4 and they are not limited to being located around every bearing.

In every pair of iron plates 1, 2 of an antiseismic connector, holes are placed opposite to one another.

Casings 5, such as cones or cylinders, are soldered to the holes of each plate, forming corresponding pairs of an upper casing such as the cylinder 5a and a lower casing such as the cylinder 5b. The upper end of the prestressed tendon 6 of the antiseismic connector is anchored in the superstructure and the lower end is anchored in the foundation.

Figure 6:
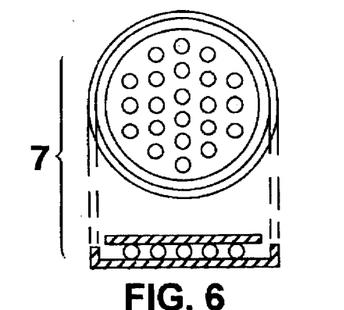
FIG. 6 is a schematic view of a bearing with spherical elements.

Between the plates 1, 2, a bearing 3 is situated wherever suitable for seismic isolation. The bearing may be made from metal (as shown as numeral 7 in FIG. 3, and FIGS. 4, and 6), of rubber material (as shown as numeral 3 in FIG. 1, and FIGS. 5 and 8, 10, 12, 13, 14, 15), of polytetrafluoroethylene (PTFE) materials or its composites or steel or its composites (FIG. 9 shows a sliding bearing with one flat sliding interface), or other materials with suitable properties.

As used throughout this specification, the term "bearing" refers to any appropriate bearing unless specifically noted. The bearing is intended to receive and transfer all the compressive static and dynamic loads (+P) from the superstructure to the foundation, and additionally to create restoring forces returning the superstructure and the foundation to their pre-earthquake spatial relationship.

Figure 7:
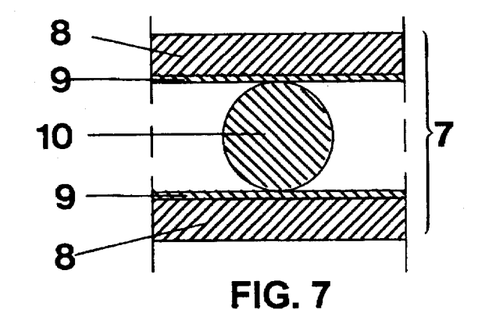
FIG. 7 is a schematic cross section view of a spherical element between two hard discs that can be made of steel or composites of it or other material with suitable properties and two soft discs that can be made of elastic or lead sheet or other material with suitable properties.

As seen in FIG. 7, the metal bearing 7 (FIGS. 3, 4 and 6) can be made of at least two circular hard discs 8 that can be made of steel or of its composites or other material with suitable properties, as will be appreciated by one of ordinary skill in this art. Discs 9 that can be made of hard elastic or lead or other material with suitable properties as will be appreciated by one of ordinary skill in this art, are located between the two hard discs 8 on the internal face of each disc. Spherical elements 10, made of steel or synthetic material or other material with similar strength, are disposed between the hard elastic discs 9. The number of spherical elements 10 is selected to be capable of supporting all the compressive static and dynamic loads (+P) from the superstructure to the foundation.

Figure 4:
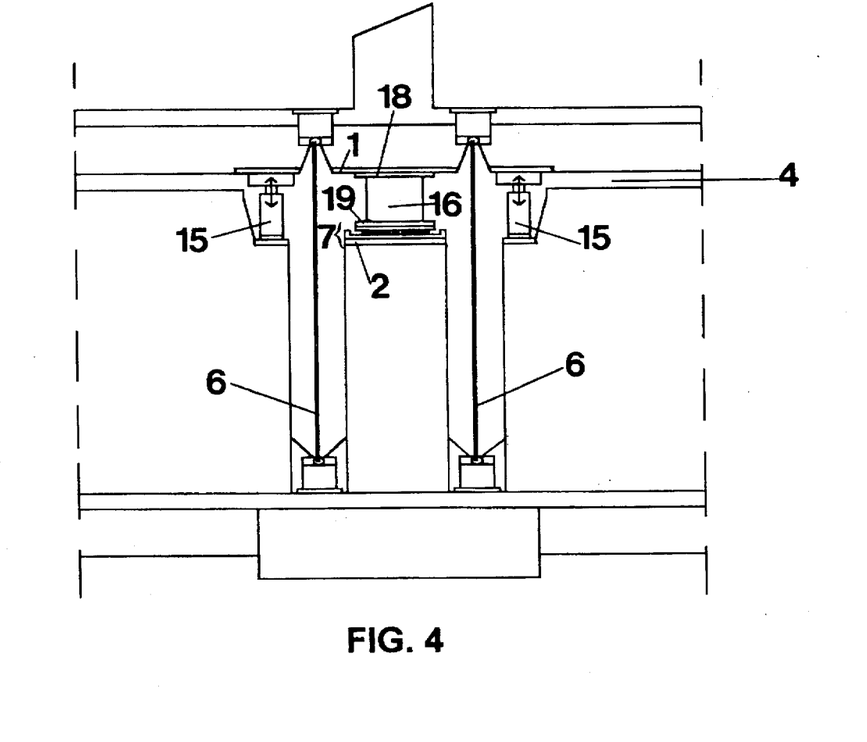
Figure 5:
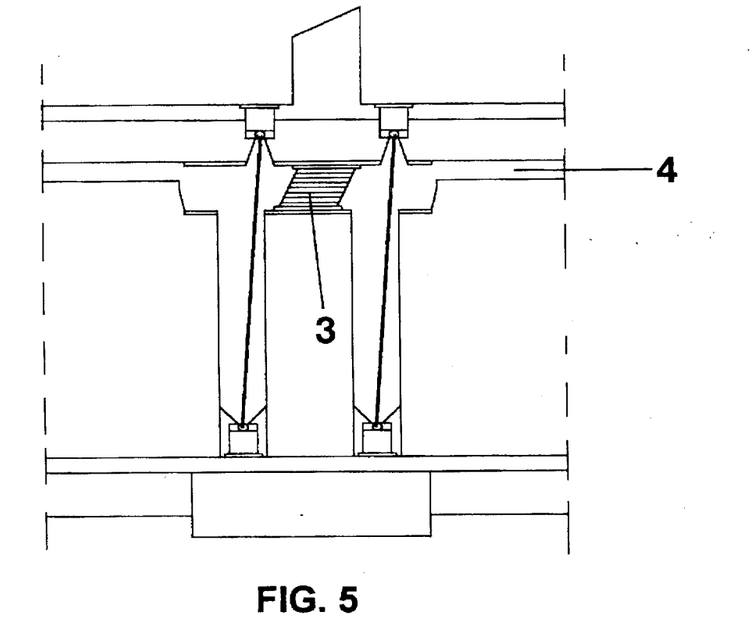
FIG. 5 is a schematic view of the operation of a pair of cylinders and a pair of unbonded tensioned prestressed cables during a ground excitation.

As seen in FIG. 4, the bearing can comprise an additional part—a cap—16 such as a cylinder that is disposed between the superstructure and the metal bearing 7. The cylinder can be made of metal, such as iron, or any other material with suitable properties, as will be appreciated by one of ordinary skill in this art. The cylinder can be constructed of a steel cylindrical pipe whose upper end is capped with a cap 18 adapted to be attached to the bottom face of the upper plate 1, with bolts such that it may be replaced easily. The lower end of the cylindrical pipe 16 is also capped with a cap 19, adapted to be attached to the upper face of the metal bearing 7, with bolts such that it may be replaced easily.

Figure 8:
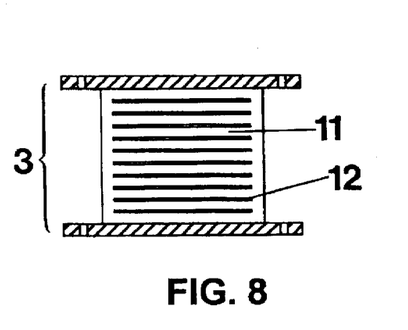
FIG. 8 is a schematic cross section view of a bearing of rubber material for use with the connector for FIG. 1.
Figure 9:
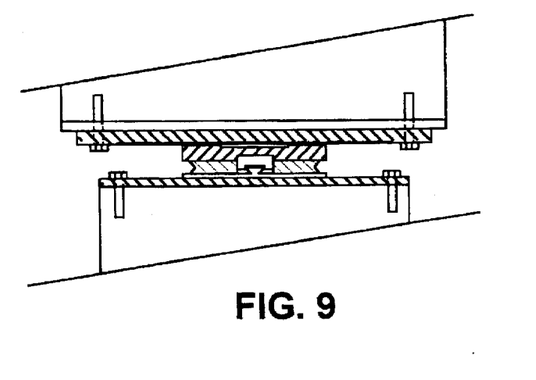
FIG. 9 is a schematic cross section view of a sliding bearing that consists of one flat sliding interface for use with the connector for FIG. 1.
Figure 10:
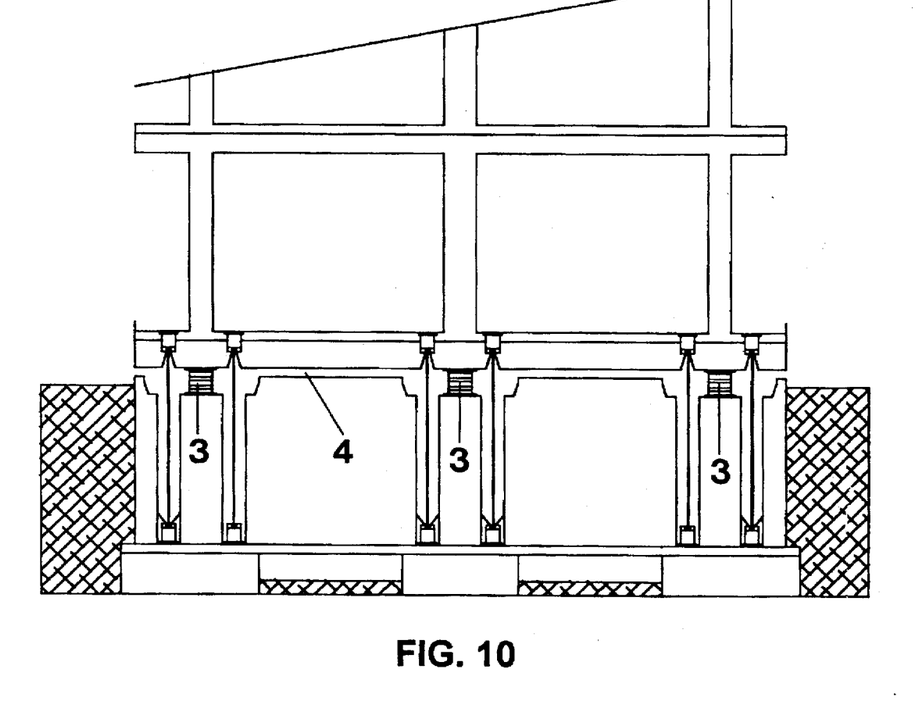
FIG. 10 is a schematic cross section view of a building having connectors in accordance with the present invention.

As seen in FIG. 8, according to another embodiment of the invention, the bearing 3 can be made of successive layers 11 of rubber or its composites or other material with suitable properties, as will be appreciated by one of ordinary skill in this art, and reinforcing sheets 12 that can be made of steel or its composites or other material with similar strength, having dimensions determined by the properties which we want to give to the bearing. This creates a kind of sandwich of alternating elastic and steel plates. This bearing has the property, when loaded from vertical compressive forces, to undergo very little compressibility, which means that the ratio of its compression stiffness to the shear stiffness is at least 400. Despite the horizontal forces exerted by the foundation on the bearing, the bearing reduces the seismic force input into the superstructure because of its low stiffness on shearing deformation.

The presence of reinforcing sheets 12 in the rubber bearing is not necessary, thereby block rubber bearings can be used.

When the bearings are subjected to horizontal ground excitation, they deform horizontally reducing the seismic force input into the superstructure. At the same time, the prestressed cables receive all vertical tensile forces that may occur at the bearing level. Furthermore, the prestressed cables generate additional horizontal recentering forces to the superstructure, acting as a second line of defense for the isolation system.

The rubber bearings must be designed in such a way as to safely transfer the vertical compressive static and dynamic loads of the superstructure to the foundation. This is of particular concern when these bearings deform horizontally due to the ground excitation of the foundation. Manufacturers of rubber bearings give all the required specifications for the design and use of appropriate bearings.

According to another embodiment of the invention, the bearing can consist of at least one flat or curved sliding interface that is made of polytetrafluoroethylene (PTFE) materials or its composites or steel or other materials with suitable properties wherein, when the bearing is under the influence of horizontal forces, the bearing accommodates horizontal deformations. FIG. 9 shows such a bearing, that consists of one flat sliding interface.

As seen in FIG. 1, in every pair of the plates 1, 2 of a antiseismic connector, holes are placed opposite to one another. Pairs of casings, such as cylinders 5a, 5b are solidly mounted, such as by soldering, to the plates 1, 2 about the holes.

The cylinders which are soldered solidly to the top face of the upper plate 1 (located at the base of the pillar) and to the bottom face of the lower plate 2 fit precisely to the circumference of each hole of the plates. These casings have the following use: A prestressed cable (tendon) 6 traverses every pair of casings interconnecting the superstructure with the foundation wherein, the casings create the recommended free space for the movement of the cables, and additionally protect the prestressed cables from environmental influences.

Figure 2:
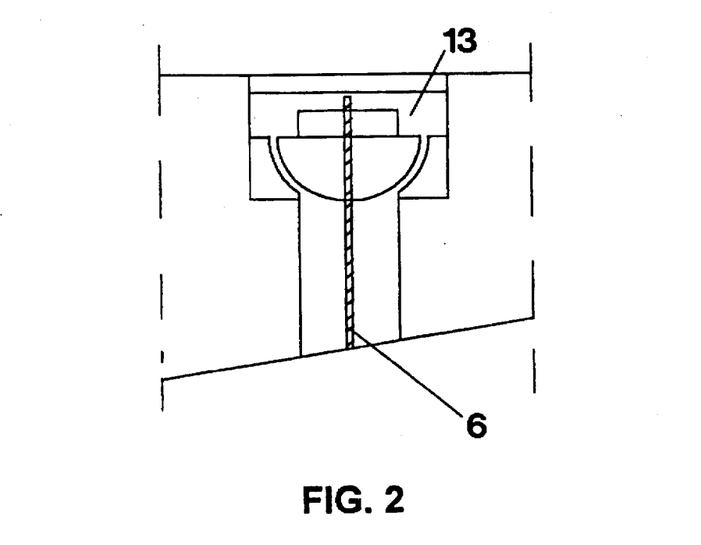
FIG. 2 is a schematic cross section view of the means anchoring the prestressed armament cables in the foundation or the superstructure.

As seen in FIG. 1, at the upper end of each casing 5a and at the lower end of each casing 5b, there is a way of anchoring the tendon 6 in the superstructure and the foundation, that allows the anchors of the tendon to rotate in order to avoid any bending stresses in the cables and the anchors. Those stresses could be induced due to the relative horizontal movement between the two anchoring points of the cables. Furthermore, the anchors are restricted to any horizontal and vertical movement and they can be made of polytetrafluoroethylene (PTFE) materials or its composites or steel or other materials, as will be appreciated by one of ordinary skill in this art. This anchoring setup permits easy replacement of the cables. FIG. 2 shows a schematic cross sectional view of one such suitable anchoring mechanism 13, that can be made of steel or its composites or synthetic material or its composites or other material with suitable properties, as will be readily understood by one of ordinary skill in this art.

The prestressed rods 6 extend through the casings and are anchored in the foundation and in the superstructure, thereby interconnecting these two parts of the structure. During the horizontal relative displacement of the foundation to the superstructure the armament cables will be stretched a minimal length due to their natural elasticity, thereby creating horizontal recentering forces which act to return the superstructure and foundation to their previous spatial relationship.

This way the antiseismic connector can securely receive vertical compressive forces (through the bearing), vertical tensile forces (through the prestressed cables) and horizontal forces (through both, the bearing and the armament tendons), securing the superstructure from sidewise sliding and uplift due to overturning moments.

The prestressed armament cables can be made either of iron or of one of its alloys, or of a synthetic material or one of its alloys, or of whichever material has suitable properties, as will be appreciated by one of ordinary skill in this art.

The casings of an antiseismic connector have two basic characteristics: a) their length and b) their diameter. The dimensions of the armament cables affects these characteristics. The length of the casings is determined mainly by the length of the armament rods of the antiseismic connector. To secure the correct function of the antiseismic connector, the diameter of the casing (in the case of cones the diameter of the big base, or the diameter of the cylinders) must be designed under consideration of the following parameters: the maximum amplitude of the relative displacement of the superstructure to the foundation and the position of the horizontal gap 4, that separates the superstructure from the foundation, with respect to the anchoring points of the armament rods.

The required diameter of the armament cables 6—or/and their number—is determined based on the vertical tensile loads from the superstructure on the antiseismic connectors.

The length of the prestressed armament cables primarily depends on the following two factors: a) the diameter of the cables and b) the horizontal force which has to be generated by each cable during the seismic excitation of the foundation.

The casings and the cables of the antiseismic connector are basic elements for the correct function of the connector to all kinds of ground vibration.

Figure 3:
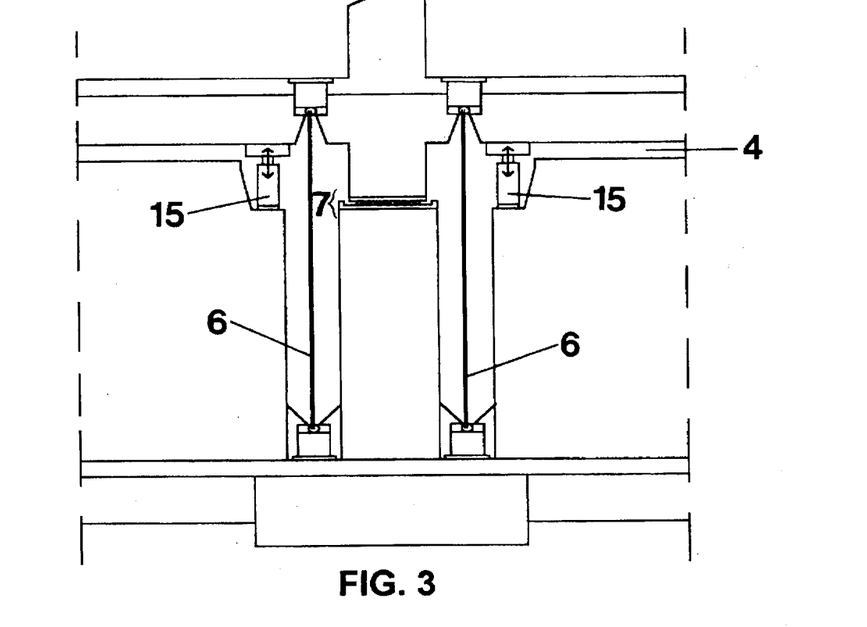
FIG. 3 and FIG. 4 is a schematic view of a second embodiment of the antiseismic connector of this invention.

Every antiseismic connector is placed at the columns or the walls of the construction in a special widening of the horizontal gap 4 that separates the superstructure from the foundation (see FIGS. 3, 4, 5, 10, 12, 13, 14 and 15). Consequently, during the life of the building, all the antiseismic connectors can be reached for inspection and repair. Both the prestressed armament rods of the connectors and the bearing are visible for control reasons. The control of the bearings and the prestressed cables can be done in order to secure the optimum condition of both the bearings and the armament cables. We can check any deformation of the bearing and therefore replace it. We can also check the predetermined prestress of the armament cables together with their present condition. Any necessary replacements of the bearings or prestressed cables can be done as follows: lifting jacks 15 (as shown in FIGS. 3 and 4) of sufficient lifting capability are placed in the horizontal gap 4, close to the bearing. The superstructure is raised 2–3 mm at a minimum in order to liberate the bearing. Before the lifting, we loosen the prestress on the armament cables.

Figure 11:
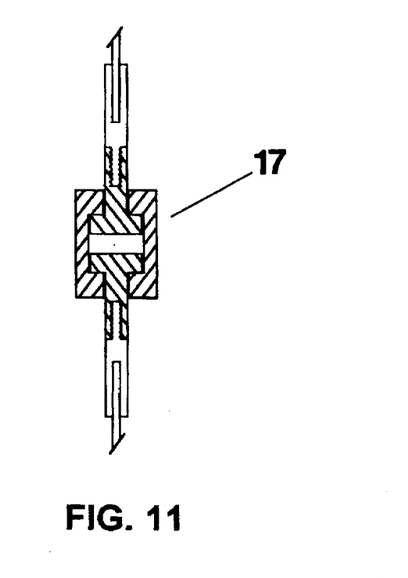
FIG. 11 shows a schematic cross section view of a joint fragment that connects the in-between ends of the parts of a prestressed cable, for the case that the cable consists of more than one part.

FIG. 11 shows a schematic cross section view of a joint fragment 17 that connects the in-between ends of the parts of a prestressed cable, for the case that the cable consists of more than one part. It can be made of steel or its composites or synthetic material or its composites or other material with suitable properties.

Figure 12:
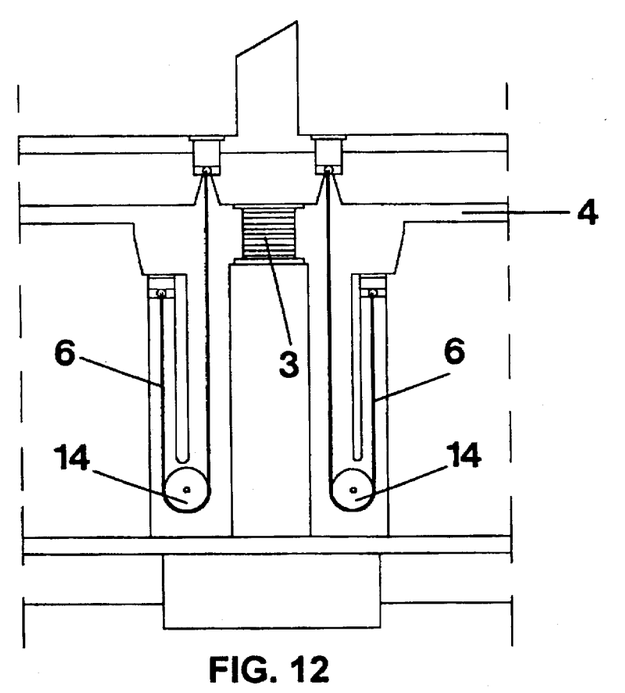
FIG. 12 shows a schematic view of an alternative way of arranging the prestressed tendons wherein, one end of the tendon is anchored in the superstructure and the other end is anchored in the foundation.

FIG. 12 shows a schematic view of an alternative way of arranging the prestressed tendons wherein, one end of the tendon is anchored in the superstructure and the other end is anchored in the foundation. Parts 14 that are placed in the foundation are supports that can rotate but do not permit horizontal or vertical movement.

Figure 13:
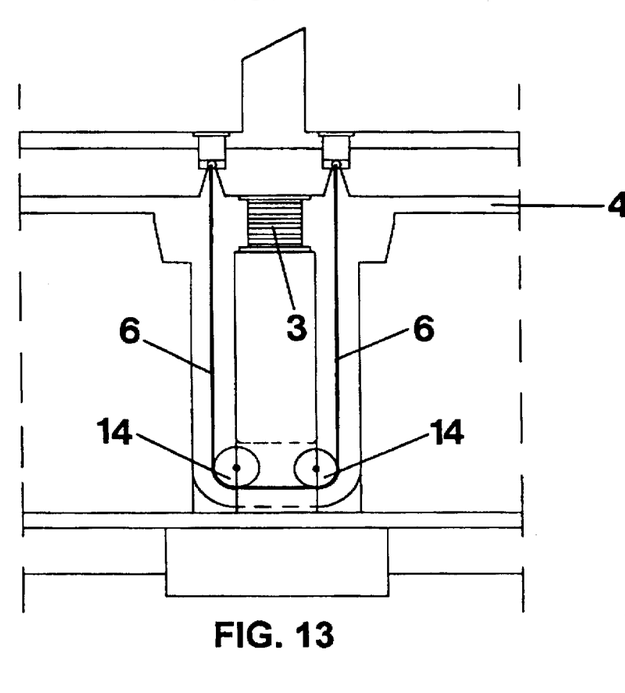
FIG. 13 shows a schematic view of an alternative way of arranging of the prestressed tendons wherein, both ends of the tendon are anchored in the superstructure.

FIG. 13 shows a schematic view of an alternative way of arranging the prestressed tendons wherein, both ends of the tendon are anchored in the superstructure. Parts 14 that are placed in the foundation are supports that can rotate but do not permit any horizontal or vertical movement.

Figure 14:
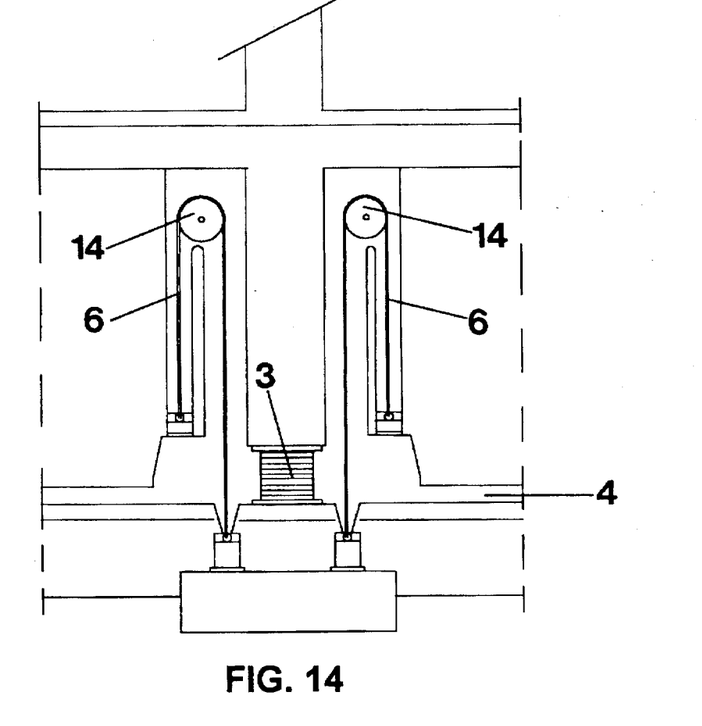
FIG. 14 shows a schematic view of an alternative way of arranging the prestressed tendons wherein, one end of the tendon is anchored in the superstructure and the other end is anchored in the foundation.

FIG. 14 shows a schematic view of an alternative way of arranging the prestressed tendons wherein, one end of the tendon is anchored in the superstructure and the other end is anchored in the foundation. Parts 14, that are placed in the superstructure, are supports that can rotate but do not permit any horizontal or vertical movement.

Figure 15:
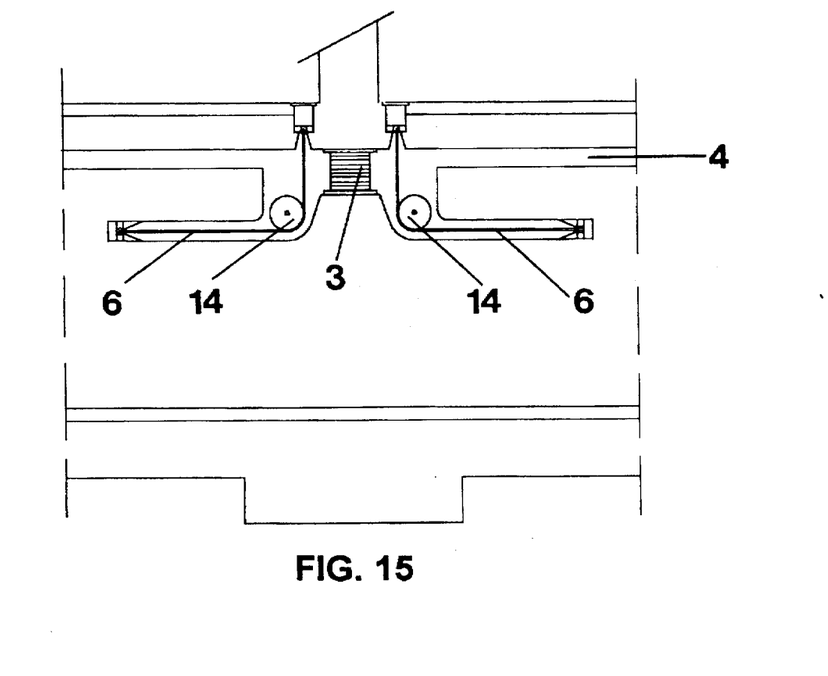
FIG. 15 shows a schematic view of an alternative way of arranging the prestressed tendons wherein, one end of the tendon is anchored in the superstructure and the other end is anchored in the foundation.

FIG. 15 shows a schematic view of an alternative way of arranging the prestressed tendons wherein, one end of the tendon is anchored in the superstructure and the other end is anchored in the foundation. Parts 14 that are placed in the foundation are supports that can rotate but do not permit any horizontal or vertical movement.

The connector of seismic isolation of a structure as described above has the following advantages:

1. It secures every structure from the destructive horizontal components of the seismic excitation, creating a safe seismic isolation.
2. It provides a permanent capacity to absorb vertical tensile forces that may occur in the isolation system due to overturning moments of the superstructure.
3. It secures the superstructure from uplift.
4. The absorption of the vertical tensile forces does not occur suddenly, but softly and progressively.
5. It contributes to the prevention of rocking motion of the superstructure, in the case that the earthquake isolation system consists of rubber bearings.
6. During a ground excitation, the prestressed cables produce recentering forces, supporting the safety of the superstructure, and contributing to smaller residual displacements in the isolation system.
7. It securely establishes the antiseismic design. We, therefore, will be able to design the superstructure securely and precisely limiting the elastoplastic deformations of the construction to the antiseismic connectors only.

We must also mention here that the description of this invention has been done as an indicating example, not to create limitations. The scope of the invention is defined by the claims. Therefore every modification or alteration concerning the shape, the size, the materials used and the construction and the assembling fittings can be included as will be appreciated by those having ordinary skill in this art.

We claim:

1. An antiseismic connector of limited vibration for the safe seismic isolation of structures having a superstructure and a foundation, comprising:

an upper plate adapted to be mounted on the superstructure;

a lower plate adapted to be mounted on the foundation;

at least one upper casing mounted on the upper plate;

at least one lower casing mounted on the lower plate such that the upper casing is disposed opposite from the lower casing;

at least one prestressed cable, which is approximately vertically arranged in the upper and lower casing, the cable having a first end anchored in either the superstructure or the foundation and a second end anchored in either the foundation or the superstructure, wherein a space is provided between the cable and the casing to permit relative vertical and horizontal movement between the ends of the cable; and a bearing disposed between the upper plate and the lower plate.

2. The antiseismic connector of claim 1, wherein the bearing has a cap adapted to be removably mounted on the upper plate, the connector further comprising a second bearing comprising two circular hard-discs, two soft discs disposed between the hard discs, and a plurality of spherical elements disposed between the soft discs.

3. The antiseismic connector of claim 1, wherein the bearing comprises successive alternating layers of a rubber-like material and flat plates wherein, when the bearing is loaded by a vertical compressive load it undergoes only relatively little compressibility and, when the bearing is subject to a horizontal force, the bearing undergoes horizontal deformation.

4. The antiseismic connector of claim 1, wherein the bearing comprises at least one sliding interface wherein, when the bearing is subject to a horizontal force, the bearing accommodates horizontal deformation.

5. The antiseismic connector of claim 1, further comprising an anchoring mechanism, wherein the cable ends are removably anchored by the anchoring mechanism so as to allow the anchoring mechanism to rotate while still being restricted from horizontal or vertical movement.

6. The antiseismic connector of claim 1, wherein the prestressed cable comprises steel or a suitable synthetic material.

7. An antiseismic connector of limited vibration for the safe seismic isolation of structures having a superstructure and a foundation, comprising:

at least one upper casing located in the superstructure;

at least one lower casing located in the foundation such that the upper casing is disposed opposite from the lower casing;

at least one prestressed cable which is approximately vertically arranged in the upper and lower casing, the cable having a first end anchored in either the foundation or the superstructure, and a second end anchored in either the superstructure or the foundation, wherein a space is provided between the cable and the casing to permit relative vertical and horizontal movement between the ends of the cable; and a bearing disposed between the superstructure and the foundation.

8. The antiseismic connector of claim 7, wherein the bearing has a cap adapted to be removably mounted on the superstructure, the connector further comprising a second bearing comprising two circular hard discs, two soft discs disposed between the hard discs, and a plurality of spherical elements disposed between the soft discs.

9. The antiseismic connector of claim 7, wherein the bearing comprises successive alternating layers of a rubber-like material and flat plates wherein, when the bearing is loaded by a vertical compressive load it undergoes only relatively little compressibility and, when the bearing is subject to a horizontal force, the bearing undergoes horizontal deformation.

10. The antiseismic connector of claim 7, wherein the bearing comprises a rubber-like material and when the bearing is subject to a horizontal force the bearing undergoes horizontal deformation.

11. The antisiesmic connector of claim 7, wherein the bearing comprises at least one sliding interface wherein, when the bearing is subject to a horizontal force, the bearing accommodates horizontal deformation.

12. The antiseismic connector of claim 7, further comprising an anchoring mechanism, wherein the cable ends are removably anchored by the anchoring mechanism so as to allow the anchoring mechanism to rotate while still being restricted from horizontal or vertical movement.

13. The antiseismic connector of claim 7, wherein the prestressed cable comprises steel or a suitable synthetic material.

14. An antiseismic connector of limited vibration for the safe seismic isolation of structures having a superstructure and a foundation, comprising:
 at least one prestressed cable which is approximately vertically arranged having a first end anchored in either the superstructure or the foundation, and a second end anchored in either the foundation or the superstructure; and
 a bearing disposed between the superstructure and the foundation;
 the cable being disposed to permit relative horizontal and vertical motion of the cable in the event of a ground excitation and to provide additional horizontal recentering forces in order to return the superstructure to its relative pre-excitation spatial relationship with the foundation.

15. The antiseismic connector of claim 14, wherein the bearing has a cap adapted to be removably mounted on the superstructure, the connector further comprising a second bearing comprising two circular hard discs, two soft discs disposed between the hard discs, and a plurality of spherical elements disposed between the soft discs.

16. The antiseismic connector of claim 14, wherein the bearing comprises successive alternating layers of a rubber-like material and flat plates wherein, when the bearing is loaded by a vertical compressive load it undergoes only relatively little compressibility and, when the bearing is subject to a horizontal force, the bearing undergoes horizontal deformation.

17. The antiseismic connector of claim 14, wherein the bearing comprises a rubber-like material and when the bearing is subject to a horizontal force the bearing undergoes horizontal deformation.

18. The antiseismic connector of claim 14, wherein the bearing comprises at least one sliding interface wherein, when the bearing is subject to a horizontal force, the bearing accommodates horizontal deformation.

19. The antiseismic connector of claim 14, further comprising an anchoring mechanism, wherein the cable ends are removably anchored by the anchoring mechanism so as to allow the anchoring mechanism to rotate while still being restricted from horizontal or vertical movement.

20. The antiseismic connector of claim 14, wherein the prestressed cable comprises steel or a suitable synthetic material.

* * * * *